Figure 1:
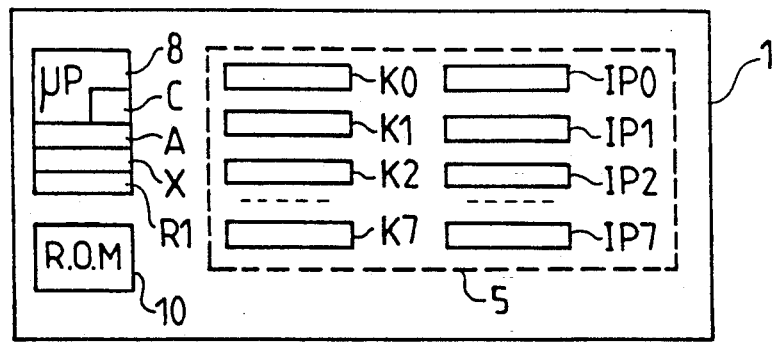

United States Patent [19]

Leterrier et al.

[11] Patent Number: 5,168,523
[45] Date of Patent: Dec. 1, 1992

[54] METHOD OF ROTATING A WORD CONSTITUTED BY BINARY ELEMENTS AND ARRANGEMENT IN WHICH THE SAID METHOD IS CARRIED OUT

[75] Inventors: Benoît Leterrier, Verrieres Le Buisson; Xavier Delaporte, Trappes, both of France

[73] Assignee: U.S. Philips Corp., New York, N.Y.

[21] Appl. No.: 558,124

[22] Filed: Jul. 24, 1990

[30] Foreign Application Priority Data

Jul. 25, 1989 [FR] France .................. 89 10002
Jan. 19, 1990 [FR] France .................. 90 00621

[51] Int. Cl.$^5$ .............................................. H04L 9/00
[52] U.S. Cl. ............................................... 380/50
[58] Field of Search ........................................ 380/50

[56] References Cited

PUBLICATIONS

IBM Technical Disclosure Bulletin, vol. 29, No. 12, May 1987, pp. 5594–5595, "Software Data Encryption Standard".

*Primary Examiner*—Thomas H. Tarcza
*Assistant Examiner*—David Cain
*Attorney, Agent, or Firm*—Jack D. Slobod

[57] ABSTRACT

A method of rotating a word constituted by binary elements $b_0$ to $b_{p-1}$ arranged from a position $P(i)$ to a position $P(i+p-1)$ in a global format containing $p+n$ binary elements arranged according to the positions $P(1)$ to $P(p+n)$, which global format is contained in one or more registers (K0–K7) as elementary formats is performed by a microprocessor (8) for carrying out instructions with respect to the elementary formats of clockwise rotation, counterclockwise rotation and an instruction of transfer of a binary element to a carry register (c), which instructions are stored in a read-only memory.

4 Claims, 5 Drawing Sheets

FIG. 7 a

|   |   |   |   |   |   |   |   |     |
|---|---|---|---|---|---|---|---|-----|
| 1 | 2 | 3 | 4 | 5 | 6 | 7 | 8  | — IP0 |
| 9 | 10| 11| 12| 13| 14| 15| 16 | — IP1 |
| 17| 18| 19| 20| 21| 22| 23| 24 | — IP2 |
| 25| 26| 27| 28| 29| 30| 31| 32 | — IP3 |
| 33| 34| 35| 36| 37| 38| 39| 40 | — IP4 |
| 41| 42| 43| 44| 45| 46| 47| 48 | — IP5 |
| 49| 50| 51| 52| 53| 54| 55| 56 | — IP6 |
| 57| 58| 59| 60| 61| 62| 63| 64 | — IP7 |

KK1, KK2 b

| 52 | 44 | 36 | 57 | 49 | 41 | 33 | 25 | — K0 |
| 17 | 9  | 1  | 58 | 50 | 42 | 34 | 26 | — K1 |
| 18 | 10 | 2  | 59 | 51 | 43 | 35 | 27 | — K2 |
| 19 | 11 | 3  | 60 | 52 | 44 | 36 | 57 | — K3 |
| 20 | 12 | 4  | 63 | —  | —  | —  | —  | — K4 |
|    |    |    |    |    |    |    |    | — K5 |
|    |    |    |    |    |    |    |    | — K6 |
|    |    |    |    | 20 | 12 | 4  | 63 | — K7 |

METHOD OF ROTATING A WORD CONSTITUTED BY BINARY ELEMENTS AND ARRANGEMENT IN WHICH THE SAID METHOD IS CARRIED OUT

FIELD OF THE INVENTION

The present invention relates to a method of rotating a word constituted by "p" binary elements ($b_0$ to $b_{p-1}$) arranged from a position P(i) to a position P(i+p−1) in a global format provided so as to contain (p+n) binary elements arranged according to the positions P(1) to P(p+n), which global format is constituted by (a) k elementary format(s) FE(j), (j being 1 ... k) formed by x binary elements kx=p+n.

BACKGROUND OF THE INVENTION

Such a method can be used for important applications, especially for carrying out circular permutations of binary elements of a coding key to be used within a microcircuit card. The handbook entitled: "Les cartes à microcircuit" de F. Guez et al, edited in France by Manon, gives full explanation for this kind of coding. In the handbook "Security for computer networks" by D. W. Davies and W. L. Price, edited by John Willey and Sons, also more precise information is found about the algorithms used in these microcircuit cards.

With these kinds of cards, the problem is encountered of lack of space offered by the microcircuit. The space for storage of the programming information remains limited; it is therefore important that the various subprograms or routines forming part of this information have a minimum size and are used as frequently as possible.

This problem is more serious when the coding key formed by two half keys of 28 binary elements each must be processed, while the message to be enciphered or deciphered are separated into two blocks of 32 binary elements each. Therefore, there is a disparity between the format of these blocks of 32 binary elements and that of the half keys of 28 binary elements, which can be represented in the format of 32 binary elements. This format of 32 binary elements is considered as a global format, which is constituted by elementary formats of, for example, 8 binary elements each. In this case, an operation of rotation, to which these half keys are subjected within the global format, can lead to waste of programming information.

c) SUMMARY OF THE INVENTION

The object of the present invention is to propose a method of the kind mentioned in the opening paragraph, which optimizes the space for storing the programming informations.

For this purpose, such a method is characterized in that it is carried out by means of a microprocessor having an instruction of the type for testing a binary element in the elementary format with transfer of its value to a carry register, in that it implies a stage of preparation which consists of:

recopying in the positions P(1) to (Pi-1) the binary elements arranged in the positions P(p+1) to P(i+p−1) and in the positions P(i+p) to (P(p+n) the binary elements arranged in the positions P(i) to P(n) if 0<i−1<n, recopying in the positions P(1) to P(n) the binary elements arranged in the positions P(p+1) to P(p+n) if i−1=n, of recopying in the positions P(p+1) to P(p+n) the binary elements arranged in the positions P(1) to P(n) if i=1, and in that the just-mentioned stage of rotation consists of:

transferring to the carry register by means of the said carry instruction the binary element situated in the position P(n+1) for a rotation in a first sense and of carrying out successively a rotation in said first sense of all the formats of elements FE(k), FE(k−1), ... FE(1), transferring to the carry register by means of the said carry instruction the binary element situated in the position P(p+n−i+1) for a rotation in a second sense and of carrying out successively a rotation in said second sense of each format of elements FE(1), FE(2), ... FE(k).

The invention also relates to an arrangement in which the said method is carried out.

d) BRIEF DESCRIPTION OF THE DRAWINGS

In order that the invention may be readily carried into effect, it will now be described more fully, by way of example, with reference to the accompanying drawings, in which:

FIG. 1 shows an arrangement according to the invention.

Figure 2:
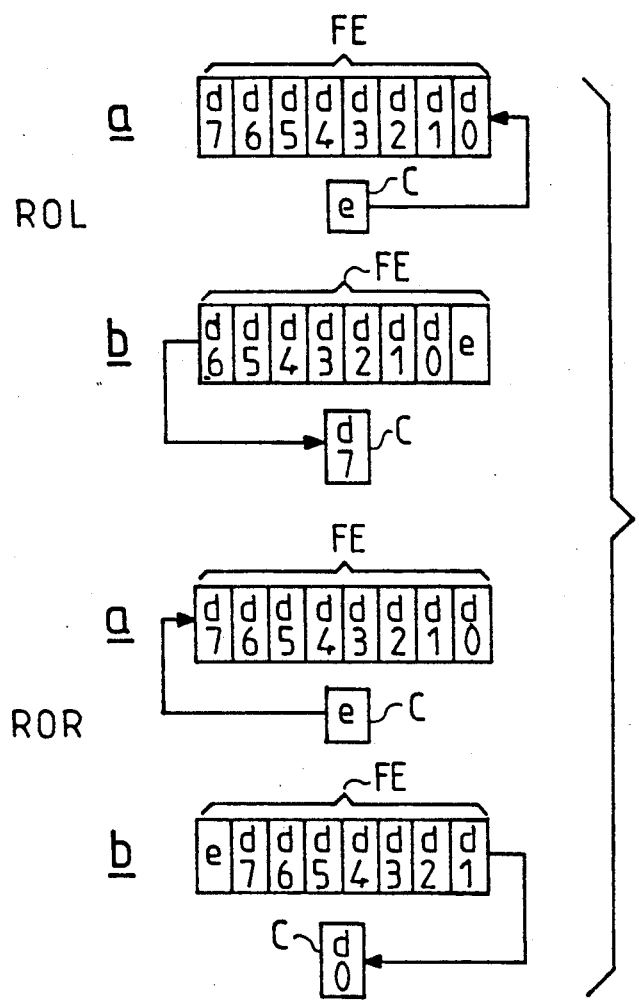

FIG. 2 explains the instructions implied by the method according to the invention.

Figure 3:
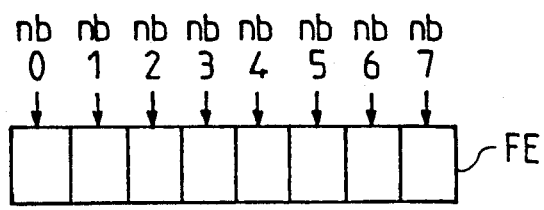
Figure 4:
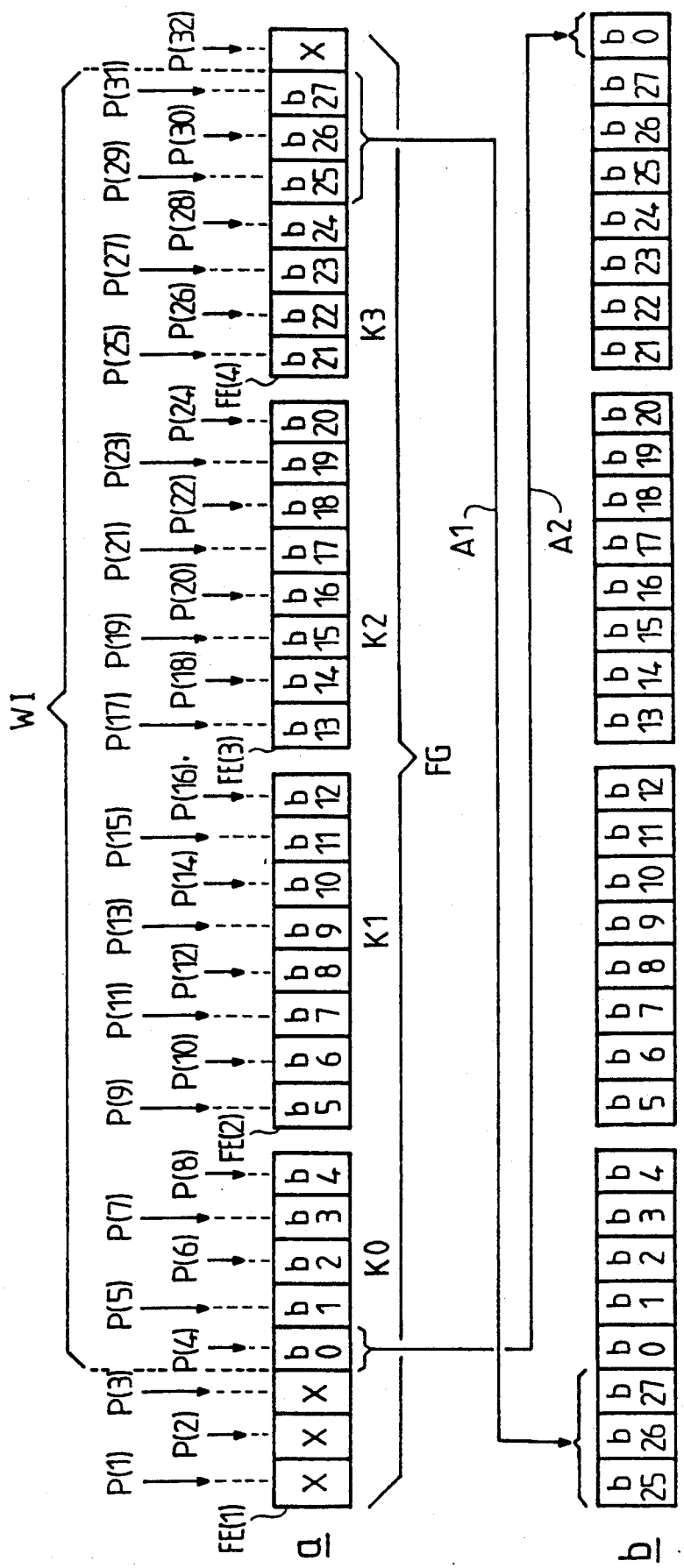
Figure 5:
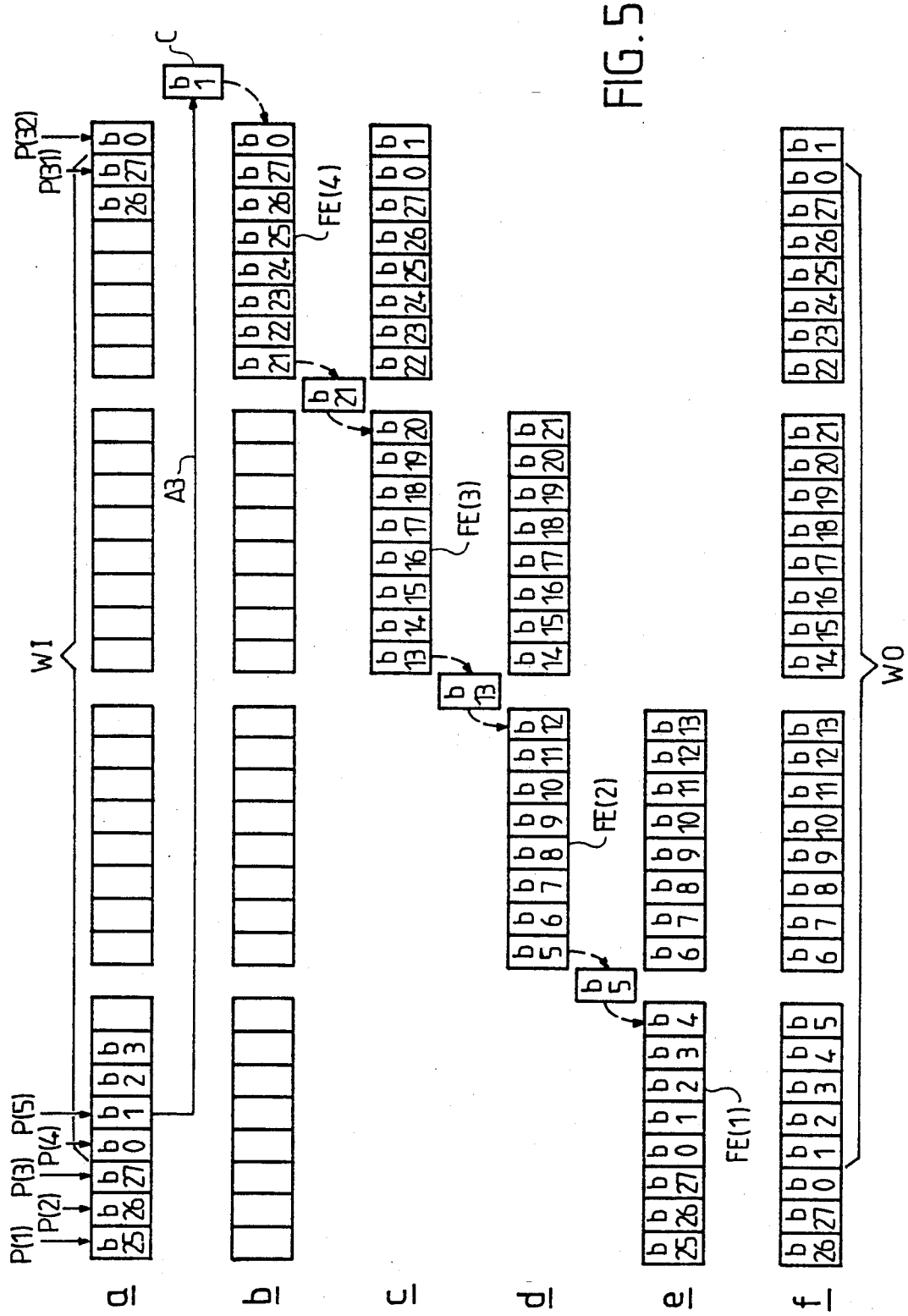
Figure 6:
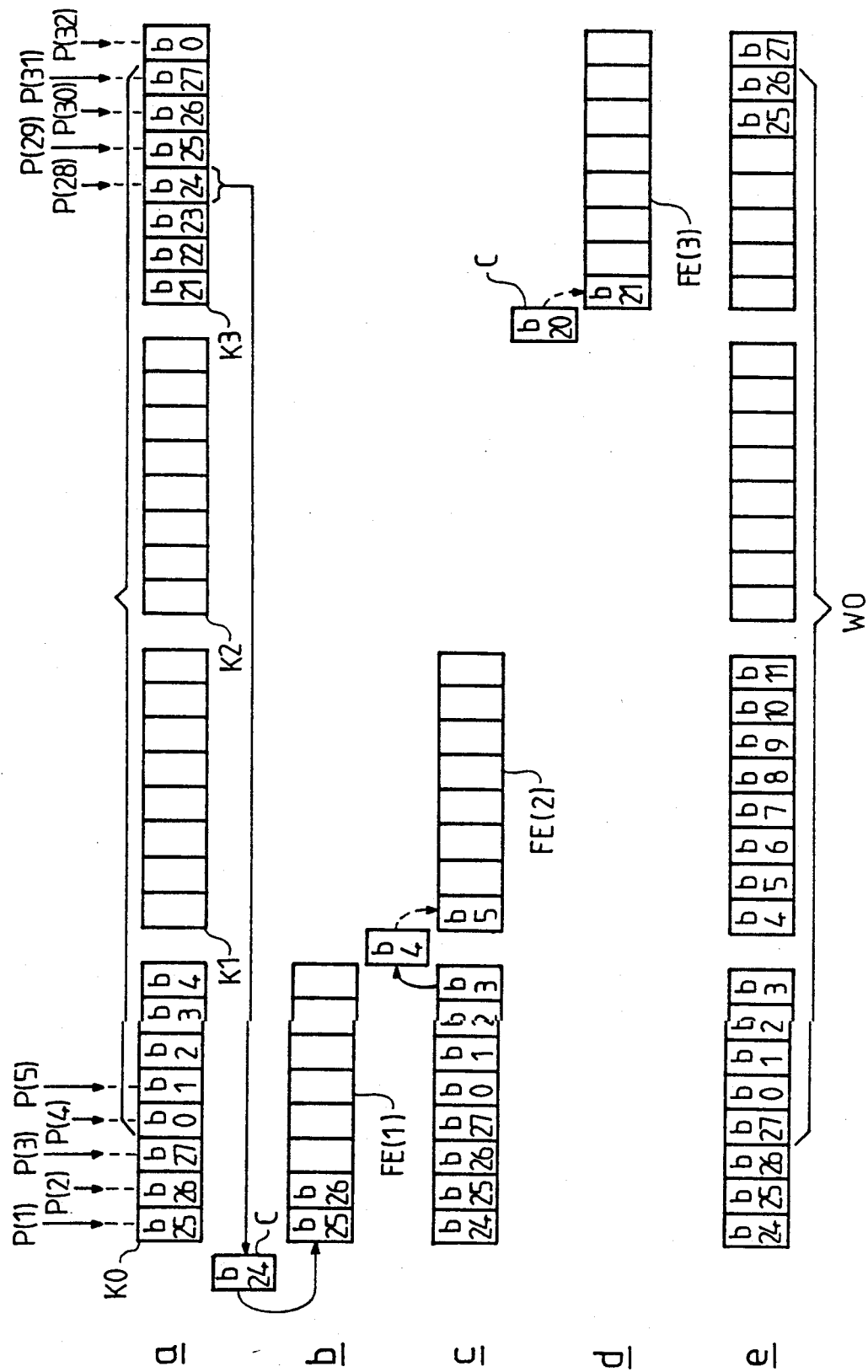

FIG. 3 explains the constitution of an elementary format,

FIG. 4 shows the arrangement of a word comprising "p" binary elements placed in a global format and the result of the preparatory stage, FIG. 5 shows the counterclockwise rotation of the word to be processed, FIG. 6 shows the clockwise rotation of the word to be processed, FIG. 7 shows the permutation effected in combination with the preparatory stage within the frame of the microcircuit card.

e) DESCRIPTION OF PREFERRED EMBODIMENTS

Reference numeral 1 in FIG. 1 denotes the arrangement in which the method is carried out, which arrangement may be a microcircuit card. The word to be processed is a coding key formed by two half keys of each 28 binary elements; the first half key is contained in four registers comprising eight binary elements K0, K1, K2, K3 and the second half key is contained in the registers K4 ... K7 forming part of a random access memory 5. A processing unit 8 operating according to instructions originating from a read-only memory 10 carries out different operations, especially on the data contained in the registers K0 to K7 of each 8 binary elements.

FIG. 1 also shows the registers IP0 to IP7 of also each 8 binary elements, from which the half keys are processed so as to be subjected to a permutation step, which will be explained hereinafter. Further, the carry register forming part of the processing unit 8 is denoted by C and different other registers are denoted by A, X, R1.

In order that these keys are subjected to the said rotations, especially the rotation instructions operating on an elementary format FE of 8 binary elements are used. The operations of these instructions are shown diagrammatically in FIG. 2. In this Figure, the two envisageable counterclockwise and clockwise rotations ROL and ROR are shown.

With regard to the instruction ROL:

at a a word $d_7 \ldots d_0$ is shown contained in an elementary working format FE and a binary element "e" contained in a carry register C before the execution of the instruction ROL;

at b the instruction has been executed and the word contained in the format FE is now $d_6\, d_5\, d_4\, d_3\, d_2\, d_1\, d_0\, e$ and the carry register contains $d_7$.

With regard to the instruction ROR:

the senses are inverted: from the starting position $d_7 \ldots d_0$ there is obtained $e\, d_7\, d_6\, d_5\, d_4\, d_3\, d_2\, d_1$, where $d_0$ is contained in the register C.

According to the invention, as processing unit 8 a microprocessor is chosen comprising an instruction of the type BRSET; for example, the microprocessor 6805 manufactured by Motorola comprises such an instruction. This instruction permits of testing any binary element $nb_0$ to $nb_7$ contained in a register of elementary format FE (FIG. 3) and this value is transferred to the register C.

It is then possible to see how the method according to the invention can be carried out. In this connection reference is made to FIG. 4, which shows how the word WI to be processed is arranged in a global format FG formed by four elementary formats FE(1), FE(2), FE(3), FE(4) of the type shown in FIG. 3, corresponding to the working format of the microprocessor mentioned above.

In FIG. 4 on line a WI designates the initial key composed of the binary elements $b_0 - b_{27}$ (p=28); this word is encoded in the aforementioned registers K0-K3 comprising eight binary elements, which corresponds to the elementary working format of the aforementioned microprocessor. The four registers K0-K3 therefore correspond to a global format FG of 32 binary elements (p+n=32) distributed over 32 positions of this format designated by p(1) to p(32) from the left to the right. The word WI, for example, occupies the positions P(i) to P(i+p−1) with i=4, i+p−1=31.

The method according to the invention provides a stage of preparation, which consists in returning to positions of the global format binary elements of the word to be processed. Thus, in the positions P(1) to P(3) situated on the lefthand side of the global format, the binary elements of the word WI situated in the positions P(29) to P(31) are recopied, that is to say that the binary elements $b_{25}$, $b_{26}$, $b_{27}$ are found back in the positions P(1), P(2) and P(3), in accordance with what is indicated by the arrow A1. In a similar manner, the binary element $b_0$ situated in position P(4) occupies the position P(32), (as indicated by the arrow A2).

The line b of FIG. 4 shows the distribution of the binary elements after this preparatory stage.

FIG. 5 illustrates the manner in which a counterclockwise rotation is carried out. For this purpose, there is started testing the binary elements following those which have been recopied in the righthand part, that is to say that in this example the binary element $b_1$ situated in the position P(5) is tested. Due to this test, the value of this binary element is recorded in the carry register C (see arrow A3). It is now easy to understand, starting from the line b, carrying out four rotations ROL and examining the lines c, d, e and f, how the rotation of the word is obtained. It should be noted that the word WO of the line f resulting from the operation can be subjected to clockwise and counterclockwise rotations without a preparatory stage being necessary.

FIG. 6 indicates a clockwise rotation. In this case it is assumed that the preparatory stage has already been carried out and that the word to be processed always occupies the positions P(4) to P(31). In this case the binary element $b_{24}$ arranged in the position P(28) is tested; its value is recopied in the register C so that the operation ROR can be carried out on the different registers K0 line c, ... K3 line d; the word WO is indicated on line e.

The different stages of the method according to the invention are now explained according to the instructions of the aforementioned microprocessor 6805.

1) PREPARATORY STAGE

|   | Comments |
|---|---|
| AND K3 1 1 1 1 1 1 1 0 | the position P(32) (register |
| STA K3 | K3) is set to zero |
| AND K0 0 0 0 1 1 1 1 | the positions P(1), P(2), P(3) |
| STA K0 | (register K0) are set to zero |
| AND K0 0 0 0 1 0 0 0 | the binary element $b_0$ is |
| ROR A | insulated |
| ROR A |   |
| ROR A | the binary element is located on the righthand side in the accumulator A |
| EOX K3 |   |
| STA K3 | the binary element $b_0$ occupies the position P(32) |
| AND K3 0 0 0 1 1 1 0 | the binary elements $b_{25}$, $b_{26}$, $b_{27}$ are insulated |
| ROL A |   |
| ROL A |   |
| ROL A | the binary elements $b_{25}$, $b_{26}$, $b_{27}$ are placed on the lefthand side |
| EOX K0 |   |
| STA K0 | the binary elements $b_{25}$, $b_{26}$, $b_{27}$ occupy the positions P91), P(2), P(3). |

2) COUNTERCLOCKWISE ROTATION

|   |   | Comments |
|---|---|---|
| BRSET 4, K0, "1b1G" |   | the binary element in the position P(5) is tested: independent of its value, the instruction present on the label "1b1G" is carried out |
| "1b1G" | ROL K3 |   |
|   | ROL K2 |   |
|   | ROL K1 |   |
|   | ROL K0 |   |

3) CLOCKWISE ROTATION

|   |   | |
|---|---|---|
| BRSET 3, K3, "1b1R: | | the binary element in the |
| "1b1G" | ROR K0 | position P(28) is tested. |
|   | ROR K1 |   |
|   | ROR K2 |   |
|   | ROR K3 |   |

It will be clear that the word to be processed can occupy any position in the global format:

either can be centered, occupy the positions P(3) to P(30), or can be located at one of the ends, for example occupy the positions P(5) to P(32), which permits of obtaining a more rapid preparatory stage.

Moreover, the invention also relates to the case in which the global format is confounded with the elementary format; the work to be processed is then contained in a single register.

The rotation of the two half keys can then be written by utilizing the notation in use for the aforementioned type of microprocessor in the following manner for the counterclockwise rotations. The number of rotations to be carried out is fixed by the content of the register A:

| "enc1" | BRSET 4, | K4 "enc2" | |
|---|---|---|---|
| "enc2" | ROL | K7 | |
| | ROL | K6 | |
| | ROL | K5 | |
| | ROL | K4 | |
| | BRSET 4, | K0 "enc3" | |
| "enc3" | ROL | K3 | |
| | ROL | K2 | |
| | ROL | K1 | |
| | ROL | K0 | |
| | DECA | | The content of the register A is diminished by one unit |
| | BNE | "enc1" | |
| | RTS | | |

For the clockwise rotations, whose number is also fixed by the content of the register A:

| "dec1" | BRSET 3, | K3 | "dec2" |
|---|---|---|---|
| "dec2" | ROR | K0 | |
| | ROR | K1 | |
| | ROR | K2 | |
| | ROR | K3 | |
| | BRSET 3 | K7 | "dec3" |
| "dec3" | ROR | K4 | |
| | ROR | K5 | |
| | ROR | K6 | |
| | ROR | K7 | |
| | DECA | | |
| | BNE | | "dec1" |
| | RTS | | |

According to an important feature of the invention, the preparatory stage can be combined with the first permutation effected on the keys; reference may be made to page 59 and especially to table 3 of the aforementioned handbook as second reference.

The two half keys are entered into registers IP0 to IP7, as indicated in FIG. 7 at a.

The numerals increasing from the left to the right and from top to bottom give the initial order of the binary elements constituting the half keys KK1 and KK2. The cross-hatched zones represent the binary elements to be suppressed.

At b in FIG. 7, the two half keys KK1P and KK2P are shown, which have been subjected to the permutations and are prepared as before; only the permutation of the key KK1 is shown in detail.

Below the instructions are given with regard to this preferred preparatory stage.

4) PREFERRED PREPARATORY STAGE COMBINED WITH A PERMUTATION

| | | | Comments |
|---|---|---|---|
| "pc1" | LDX #7 | | |
| | STX R1 | | |
| "pc11" | LDX R1 | | |
| | LDA IP | X | The concatenation of IP with the content of X gives the reference |

-continued

| | | | Comments |
|---|---|---|---|
| | | | of the register IP0 to IP7 |
| | LDX #7 | | |
| "pc12" | LSRA | | |
| | ROL K | X | The concatenation of K with (X) gives the reference of one of the registers K0 to K7 |
| | DECX | | |
| | BPL "pc12" | | The label "pc12" is reached again 7 times |
| | DEC R1 | | |
| | BPL "pc11" | | and the label "pc11" is also reached again 7 times. |
| | LDA K4 | | |
| | LDX K6 | | |
| | STX K4 | | |
| | STA K6 | | |
| | LDX K3 | | |
| | LSLX | | |
| | LSLX | | |
| | LSLX | | |
| | LSLX | | |
| | STX K7 | | |
| | LDA #4 | | |
| | BSR "dec1" | | The clockwise rotation defined above is carried out. |
| | LDA #3 | | |
| | BSI "enc1" | | The counterclockwise rotation defined above is carried out. |
| | RTS | | |

It is also taken into account that the rotation according to the invention is fully utilized in the enciphering-/deciphering processes carried out within the microcircuit card.

We claim:

1. A method of rotating a word constituted by binary elements $b_0$ to $b_{p-1}$ arranged from a register position $P(i)$ to a register position $P(i+p-1)$ in electronic register means containing a global format being formed by $p+n$ binary elements arranged according to the positions $P(1)$ to $P(p+n)$, which global format is constituted by k elementary formats $FE(1)$ to $FE(k)$, each elementary format being formed by x binary elements such that $kx = p+n$, where p and x are integers greater than one, and k, i, and n are positive integers such that $0 \leq i-1 \leq n$, which method is carried out by means of a microprocessor having a carry instruction of a type for testing a binary element in any of said elementary formats with transfer of its value to a carry register, which method includes a preparatory stage, dependent on the value of $i-1$, comprising:

if $0 < i-1 < n$, recopying in the register positions $P(1)$ to $P(i-1)$ the binary elements arranged in the register positions $P(p+1)$ to $P(i+p-1)$ and in the register positions $P(i+p)$ to $(P(p+n))$ the binary elements arranged in the register positions $P(i)$ to $P(n)$.

if $i-1 = n$, recopying in the register positions $P(1)$ to n) the binary elements arranged in the positions $P(p+1)$ to $P(p+n)$, if $i-1 = 0$, recopying in the register positions $P(p+1)$ to $P(p+n)$ the binary elements arranged in the register positions $P(1)$ to $P(n)$, which preparatory stage is followed, dependent on whether said rotating is in a first sense or in a second sense opposite to said first sense, by:

if said rotating is in said first sense, transferring to the carry register by means of the said instruction the value of the binary element situated in the register position $P(n+1)$ and carrying out successively a rotation in said first sense of all the elements of formats FE(k), FE(k−1), . . . FE(1), if said rotating is in said second sense, transferring to the carry register by means of said instruction the value of the binary element situated in the register position P(p+n−i+1) and carrying out successively a rotation in said second sense of all the elements of formats FE(1), FE(2), . . . FE(k).

2. A method as claimed in claim 1, further comprising permuting the register positions of the binary elements of said word.

3. An arrangement for rotating word constituted by binary elements $b_0$ to $b_{p-1}$ arranged from a register position P(i) to a register position P(i+p−1) in a global format containing p+n binary elements arranged according to the positions P(1) to P(p+n), which global format is constituted by k elementary formats FE(1) to FE(k), each elementary format being formed by x binary elements such that kx=p+n, where p and x are integers greater than one, and k, i, n are positive integers such that $0 \leq i-1 \leq n$, comprising:

an assembly of k registers together having the register positions P(1) through P(p+n) for containing the binary elements of the k elementary formats;

a microprocessor for carrying out instructions with respect to the binary elements in said assembly of registers, including a carry instruction of a type for testing a binary element in any of said elementary formats with transfer of its value to a carry register; and a read-only memory containing instructions for said microprocessor, said instructions comprising a preparatory stage, dependent on the value of i−1, directing the microprocessor to carry out:

if 0<i−1<n, recopying in the register positions P(1) to P(i−1) the binary elements arranged in the register positions P(p+1) to P(i+p−1) and in the register positions P(i+p) to (P(p+n) the binary elements arranged in the register positions P(i) to P(n), if i−1=n, recopying in the register positions P(1) to P(n) the binary elements arranged in the register positions P(p+1) to P(p+n), if i−1=0, recopying in the register positions P(p+1) to P(p+n) the binary elements arranged in the register positions P(1) to P(n), which preparatory stage is followed, dependent on whether said rotating is in a first sense or in a second sense opposite to said first sense, by instructions directing the microprocessor to carry out:

if said rotating is in said first sense, transferring to the carry register by means of the said instruction the value of the binary element situated in the register position P(n+1) and carrying out successively a rotation in said first sense of all the elements of formats FE(k), FE(k−1), . . . FE(1), if said rotating is in said second sense, transferring to the carry register by means of said instruction the value of the binary element situated in the register position P(p+n−i+1) and carrying out successively a rotation in said second sense of all the elements of formats FE(1), FE(2), . . . FE(k).

4. An arrangement as claimed in claim 3, further includes instructions for directing the microprocessor to carry out permuting the register positions of the binary elements of said word.

* * * * *